United States Patent [19]

Oikawa et al.

[11] Patent Number: 4,834,422

[45] Date of Patent: May 30, 1989

[54] KNEE PROTECTIVE STRUCTURE OF VEHICLE

[75] Inventors: Akio Oikawa, Hatano; Masanori Narita, Yamato, both of Japan

[73] Assignee: Nissan Motor Co., Ltd., Yokohama, Japan

[21] Appl. No.: 100,373

[22] Filed: Sep. 24, 1987

[30] Foreign Application Priority Data

Sep. 26, 1986 [JP] Japan ............... 61-147581[U]
Sep. 27, 1986 [JP] Japan ............... 61-228751
Sep. 27, 1986 [JP] Japan ............... 61-228750

[51] Int. Cl.⁴ .................................. B60R 21/04
[52] U.S. Cl. ......................... 280/751; 280/779; 280/750
[58] Field of Search ............... 280/750, 751, 752, 779

[56] References Cited

U.S. PATENT DOCUMENTS

| | | | |
|---|---|---|---|
| 3,876,228 | 4/1975 | Hawkins et al. | 280/752 |
| 3,930,665 | 1/1976 | Ikawa | 280/752 |
| 3,938,821 | 2/1976 | Haas et al. | 280/750 |
| 4,518,172 | 5/1985 | Bortz et al. | 280/751 |
| 4,721,329 | 1/1988 | Brantman et al. | 28/751 |

FOREIGN PATENT DOCUMENTS 50-2037 1/1975 Japan.
57-32043 7/1982 Japan.

*Primary Examiner*—Kenneth R. Rice
*Attorney, Agent, or Firm*—Foley & Lardner, Schwartz, Jeffery, Schwaab, Mack, Blumenthal & Evans

[57] ABSTRACT

A knee protective panel of a vehicle, extending laterally of the vehicle in front of a driver's seat under an instrument panel and having a U-shaped cut receiving a steering column is provided with a reinforcing member fixed to the protective panel so that there is formed between the protective panel and reinforcing member an enclosed space extending laterally immediately under the U-shaped cut. In one embodiment of the invention, an opening is formed in an outboard half of the reinforcing member lying on the outboard side of the steering column so that the rigidity of the outboard half is made lower than that of the inboard half. In another embodiment, the protective panel is joined with the instrument panel through at least one intermediate bracket which is fastened with the upper end of the protective panel by bolts extending substantially vertically and which is connected with a laterally extending steering member through at least one support bracket extending forwardly and transmitting impact due to collision from the protective panel to the steering member.

16 Claims, 16 Drawing Sheets

KNEE PROTECTIVE STRUCTURE OF VEHICLE

BACKGROUND OF THE INVENTION

The present invention relates to a vehicle body structure for protecting legs of a driver or a passenger by absorbing impact in vehicle collisions.

Japanese utility model post-examination publication No. 57-32043 and Japanese utility model provisional publication No. 50-2037 disclose conventional knee protective structures, which are shown in FIGS. 14–17 and FIGS. 30 and 31.

These conventional structures are unsatisfactory in that the protection against oblique collisions is insufficient, and the connection between an instrument panel and an knee protective panel is disadvantageous in appearance and rigidity, as explained later with reference to FIGS. 14–17, 30 and 31.

SUMMARY OF THE INVENTION

It is an object of the present invention to provide a knee protective structure which can protect driver's legs sufficiently even in oblique collisions of the vehicle, and which can be fabricately easily and uncostly.

It is another object of the present invention to provide a knee protective structure which is improved in appearance and rigidity.

According to the present invention, a knee protective structure of a vehicle comprises a knee protective panel extending along a lateral direction of the vehicle under an instrument panel in front of a driver's seat and having a hollow portion such as a U-shaped cut for receiving a steering column, and a reinforcing member fixed to the protective panel so that there is formed between the protective panel and the reinforcing member an enclosed space extending under the hollow portion along the lateral direction of the vehicle.

The reinforcing member may have an opening formed in an outboard half of the reinforcing member lying on the outboard side of the steering column so that the rigidity of the outboard half of the reinforcing member is reduced as compared with the inboard half.

According to another aspect of the present invention, there are provided at least one support bracket and at least one intermediate bracket. The intermediate bracket is fixed with the lower end of an instrument panel and the upper end of a knee protective panel so that the protective panel is joined with the instrument panel through the intermediate bracket. The upper end of the knee protective panel is fixed to a substantially horizontal portion of the intermediate bracket by fastening means such as bolts extending substantially vertically. The support bracket is fixedly mounted on a laterally extending steering member and extends from the steering member to a rear end which is fixed with the intermediate bracket.

DETAILED DESCRIPTION OF THE INVENTION

To facilitate understanding of the present invention, reference is made to the conventional structure shown in FIGS. 14–17.

Figure 14:
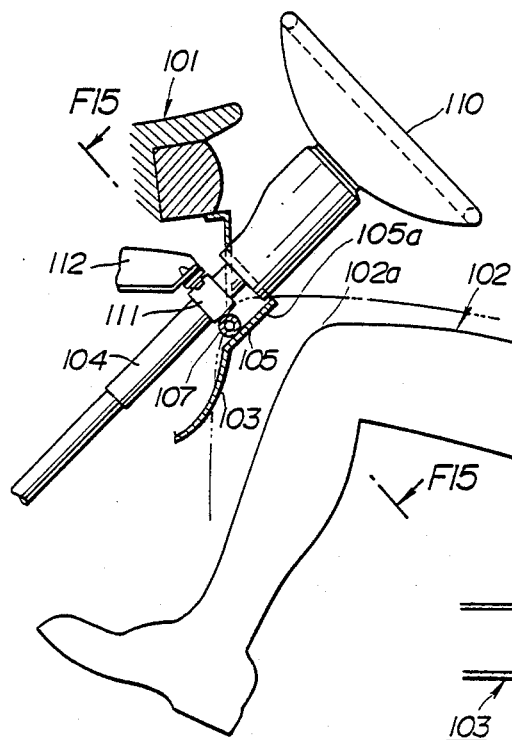
FIG. 14 is a sectional view of a conventional knee protective structure disclosed in the abovementioned Japanese publication No. 57-32043.
Figure 15:
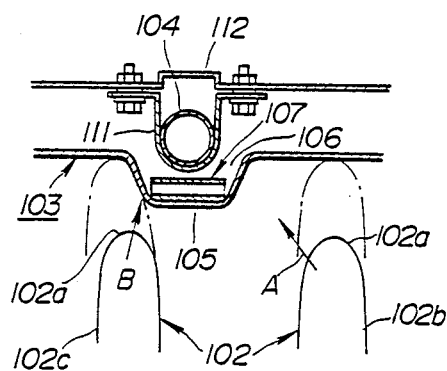
FIG. 15 is a sectional view taken across a line F15-F15 of FIG. 14.
Figure 16:
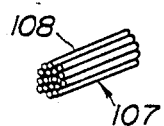
FIGS. 16 and 17 are perspective views showing two different examples of an impact absorbing member used in the structure of FIG. 14.
Figure 17:
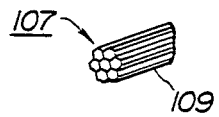

The conventional structure of FIG. 14 includes a knee protective panel 103 extending in front of a driver's seat under an instrument panel 101. The protective panel 103 serves to absorb impact due to a vehicle collision by its own plastic deformation. The protective panel 103 has a bulge portion 105 confronting a steering column 104 immediate above. As shown in FIG. 15, the bulge portion 105 is bulged toward the driver's seat so that there is formed between the steering column 104 and the protective panel 103 a sufficient interspace which allows a sufficient plastic deformation of the protective panel 103 and prevents excessive load from being applied on the driver's knee by preventing the knees from bumping against the steering column. In order to protect the knees reliably, there is provided an impact absorbing member 107 in a concave side 106 of the bulge portion 105. The impact absorbing member 107 may be in the form of a pipe, or a bundle of circular cylinders 108 shown in FIG. 16, or a bundle of hexagonal prisms 109 shown in FIG. 17. In FIG. 14, there are further shown a steering wheel 110, a steering clamp bracket 111 and a steering mount member 112.

When the steering column 104 of this conventional example is displaced rearwardly because of deformation of a dash panel (not shown) in a head-on collision from an oblique direction, then the steering clamp bracket 111 deforms a less rigid projecting edge 105a of the bulge portion 105 without bumping against the impact absorbing member 107, so that the legs 102 tends to bump against the rigid steering clamp bracket 111 and suffer injuries.

FIGS. 1–4 show the first embodiment of the present invention.

Figure 1:
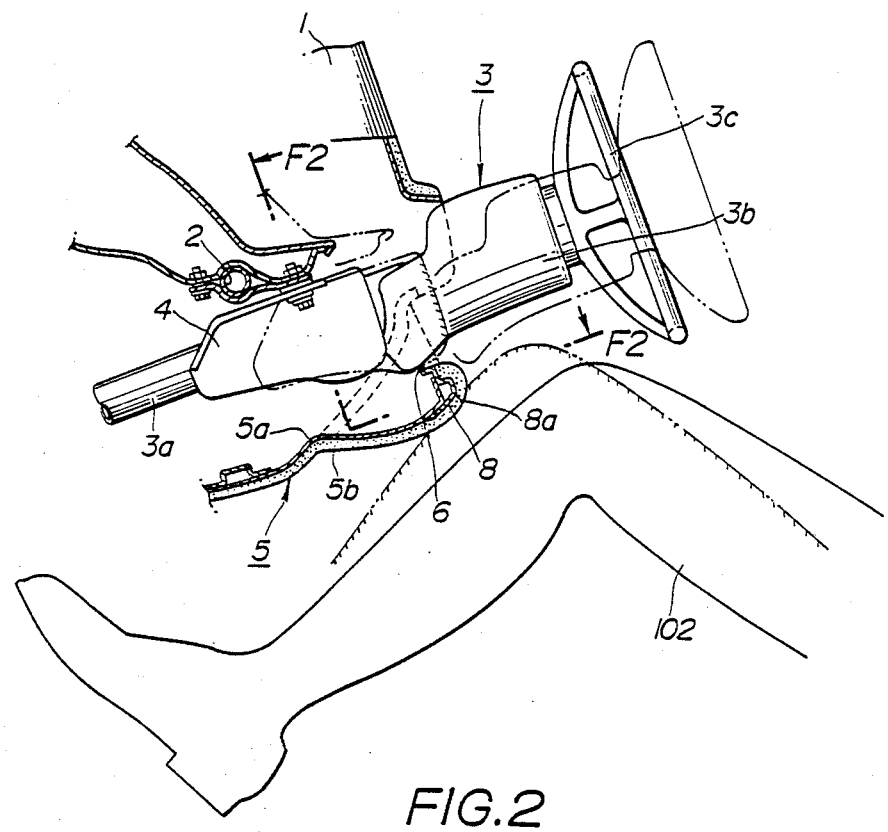
FIG. 1 is a sectional view showing a knee protective structure of a first embodiment of the present invention.
Figure 2:
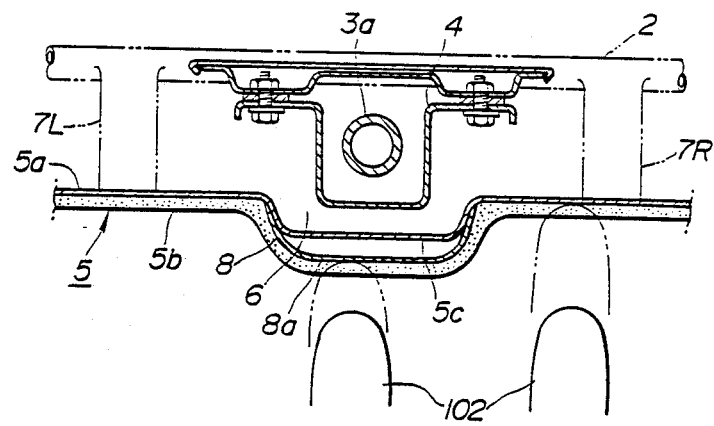
FIG. 2 is a sectional view taken across a line F2-F2 of FIG. 1.
Figure 3:
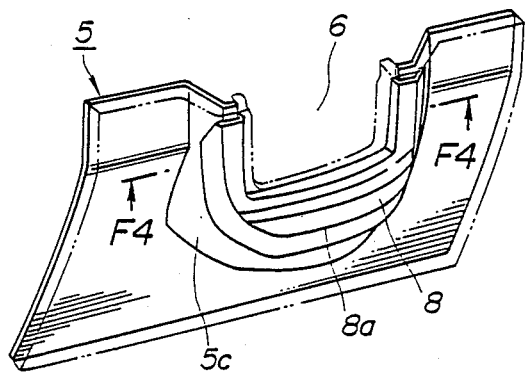
FIG. 3 is an enlarged perspective view showing a main portion of the knee protective structure of FIG. 1.
Figure 4:
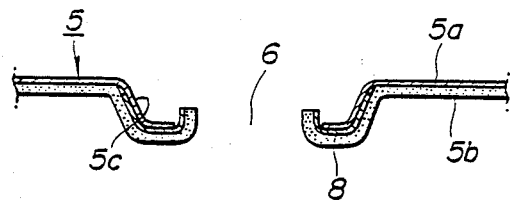
FIG. 4 is a sectional view taken across a line F4-F4 of FIG. 3.

A structure of a vehicle shown in FIG. 1 includes an instrument panel 1, and a steering member 2 extending along a lateral direction of the vehicle inside the instrument panel 1. A steering column 3 is supported on the steering member 2 through a steering clamp bracket 4. The steering column 3 is an assembly containing a steering shaft 3a, a steering column cover 3b and a steering wheel 3c.

A knee protector assembly 5 is placed below the instrument panel 1. The knee protector assembly 5 comprises a knee protective panel 5a having a relatively high rigidity, and a knee protective pad 5a covering a surface of the protective panel 5a. The protector assembly 5 has a U-shaped cut 6 for receiving the steering column 3. The steering column 3 projects into a passenger compartment through the U-shaped cut 6 of the protector assembly 5. The protector assembly 5 is fixed to the steering member 2 through left and right support brackets 7L and 7R so that the protector assembly 5 cannot be easily pushed toward the front of the vehicle by the legs of a driver.

The protective panel 5a has a U-shaped bulge portion 5c bordering the U-shaped cut 6. The bulge portion 5c bulges toward a driver's seat to a U-shaped brim, which is covered with an impact absorbing reinforcing member 8 of a shaped plate. The reinforcing member 8 has a U-shaped cross section, and extends along the brim of the bulge portion 5c. The reinforcing member 8 is joined by spot welding to an outer surface of the bulge portion 5c of the protective panel 5a which faces a passenger compartment of the vehicle. The reinforcing member 8 has a lower middle projecting portion 8a extending along the lateral direction of the vehicle. The lower middle portion 8a of the reinforcing member 8 has a C-shaped cross section, and is joined to the bulge portion 5c of the protector panel 5a so that there is formed, between the reinforcing member 8 and the protective panel 5a, an enclosed space extending along the lateral direction of the vehicle below the steering column 3 received in the U-shaped cut 6.

The knee protector assembly 5 of this embodiment has a good ability of deforming, and is supported by the brackets 7L and 7R at the positions apart from the legs of the driver. Therefore, an impact force acting on the legs of the driver during a head-on collision of the vehicle is absorbed by energy for deforming the knee protector assembly 5.

During a collision of the vehicle in an oblique direction, the steering bracket 4 may be displaced rearwardly together with the steering column 3, and a collision may occur between the steering bracket 4 and the bulge portion 5c of the knee protector assembly 5. In this case, the force applied to the bulge portion 5c from the steering bracket 4 is decentralized and distributed widely over the knee protector assembly 5 because the bulge portion 5c is made high in rigidity. Therefore, the knee protector assembly 5 of this embodiment can prevent the steering bracket 4 from locally deforming the bulge portion 5c and from directly bumping against the legs of the driver. The lower middle portion 8a of the reinforcing member 8 is deformed by an impact force due to the collision, so that the impact force is mitigated. In this way, the structure of the first embodiment protects the legs of the driver from energy of collision.

To facilitate understanding of a second embodiment of the present invention, reference is made to FIGS. 14–19.

Figure 18:
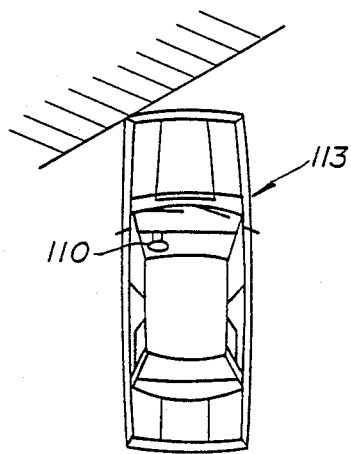
FIGS. 18 and 19 are views showing left and right oblique collisions of a vehicle.
Figure 19:
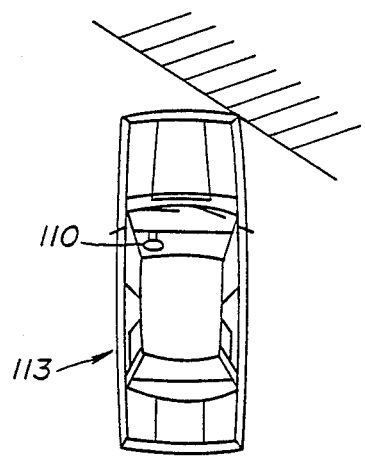

In the case of a vehicle 113 having a steering device 110 on the left side, a rearward displacement of the steering device is greater in a left oblique collision shown in FIG. 18 because the steering device is close to the point of collision, and its rearward displacement is smaller in a right oblique collision shown in FIG. 19 because the steering device is remote from the point of collision. In the case of a vehicle having a steering wheel on the right side, the rearward displacement of the steering device is great in the right oblique collision, and small in the left oblique collision.

In the left oblique collision of the vehicle having the steering wheel on the left side, a force (shown by an arrow A in FIG. 15) acting toward the bulge portion 105 is applied to the right leg 102b, but the displacement of the right leg 102b toward the bulge portion 105 is generally small. In the right oblique collision, a force (shown by an arrow B in FIG. 15) toward the bulge portion 105 is applied to the left leg 102c, and the displacement of the left leg 102c is greater than that of the right leg 102b. The reason for this is as follows: The driver is normally restrained by a passive seat belt which extends downwardly from the left shoulder to the right side of the hip in the case of the vehicle with the steering wheel on the left side. Therefore, the driver's right lap is held by the seat belt, so that the forward displacement of the right leg is small in both of the left and right oblique collisions. However, the driver's left lap is not restrained by the seat belt. Therefore, in the left oblique collision, a force toward the outboard side is applied to the left leg 102c, so that the displacement of the left leg 102c toward the bulge portion 105 is small. In the right oblique collision, a force toward the inboard side is applied to the left leg 102c, so that the displacement of the left leg 102c toward the bulge portion 105 is great.

In the case of the vehicle with the steering wheel on the right side, the passive seat belt extends from the driver's right shoulder to the left side of the hip, so that the left leg 2c is firmly held. Therefore, the forward displacement of the left leg 102c is small in both of the left and right oblique collisions, and the displacement of the right leg 102b toward the bulge portion 105 is great in the left oblique collision.

In general, the safety of the vehicle can be improved by restraining a rearward movement of the steering device and a forward movement of the driver's body. However, in view of the abovementioned differences between the left and right oblique collisions, it is desirable to design the knee protective panel 103 so as to restrain the legs from forwardly moving up to the position of the rearwardly displaced steering device in oblique collisions in which the rearward displacement of the steering device is great but the forward displacement of the legs is small (oblique collisions in which there is a possibility that the inboard part of the bulge portion 105 is largely deformed by the steering device), and to absorb impact applied on the legs as much as possible in oblique collisions in which the rearward displacement of the steering device is small but the forward displacement of the leg is great (oblique collisions in which there is a possibility that the outboard part of the bulge portion 105 is largely deformed by the leg).

The conventional knee protective structure of FIGS. 14 and 15 is unsatisfactory in that no consideration is given to the left and right oblique collisions. It is difficult to design the knee protective panel 103 with the impact absorbing member 107 so as to provide adequate protection to the legs against the left and right oblique collisions. Besides, the manufacturing cost of the protective structure is increased by the impact absorbing member which is costly.

In the second embodiment of the present invention, the bulge portion of the knee protective panel is made less rigid on the outboard side of the steering column that on the inboard side. Therefore, if the left knee of the driver of the vehicle with the steering device on the left side (or the right knee of the driver of the vehicle with the steering device on the right side) bumps against the bulge portion, the less rigid outboard half of the bulge portion is efficiently deformed so that the bulge portion of the second embodiment can protect the leg by preventing application of excessive load on the leg. The relatively rigid inboard half of the bulge portion prevents a direct collision between the steering device and the driver's leg on the inboard side in cooperation with the seat belt in the left oblique collision of the vehicle with the steering device on the left side (or the right oblique collision of the vehicle with the steering device on the right side).

FIGS. 5-10 show the second embodiment of the present invention.

Figure 6:
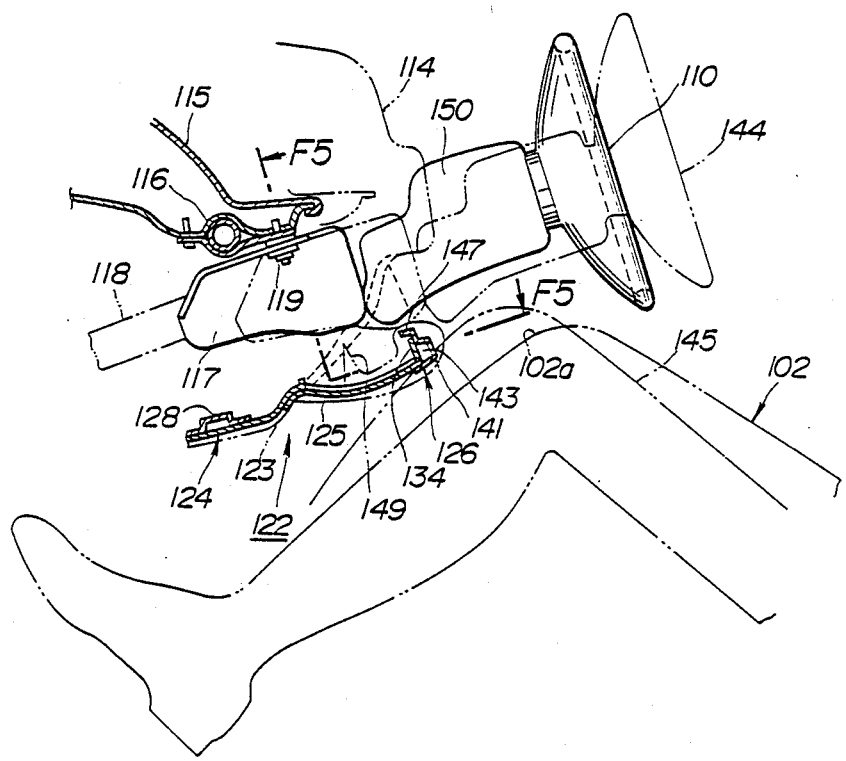
FIG. 6 is a sectional view similar to FIG. 1 but showing the knee protective structure of the second embodiment.

As shown in FIG. 6, a structure includes an instrument panel 114, a steering mount member 115, a steering member 116 and a steering clamp bracket 117. A steering column 118 is fastened to the steering mount member 115 through the clamp bracket 117 by the use of at least one bolt 119. The steering column 118 of this embodiment is arranged so that it is tiltable and it can absorb impact energy in collisions.

Figure 7:
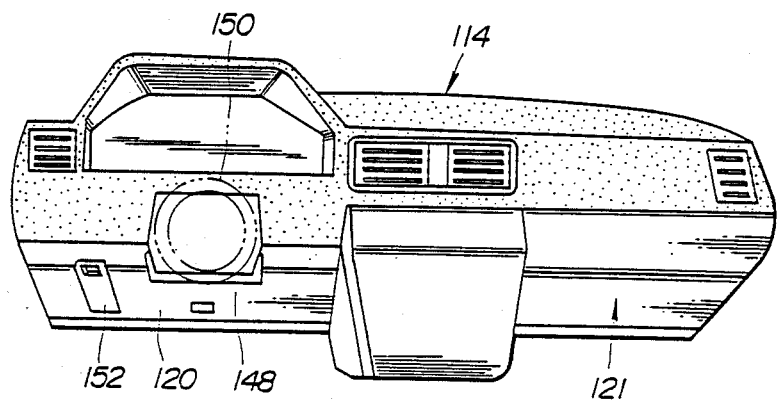
FIG. 7 is a view showing an assembly a knee protective panel and an instrument panel in the structure of FIG. 5.

As shown in FIG. 7, there are further provided left and right knee protectors 120 and 121 extending in the lateral direction of the vehicle under the instrument panel 114. The left knee protector 120 confronts a left front driver's seat and serves to protect the legs of a driver in vehicle collisions. The right knee protector 121 confronts a right front passenger's seat, and serves to protect the legs of an occupant in the right front seat. Each of the knee protectors 120 and 121 is fixed to the instrument panel 114 and a left or right side portion of the vehicle body.

Figure 5:
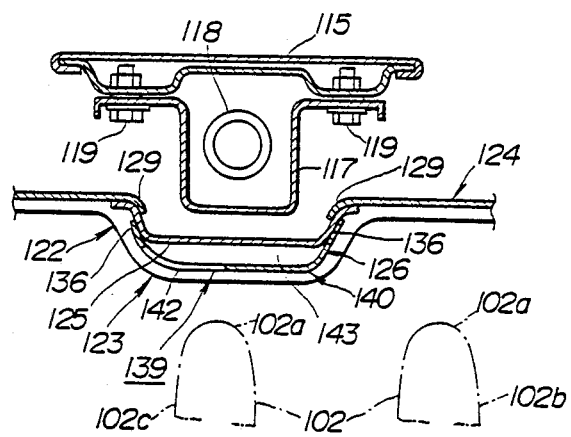
FIG. 5 is a sectional view taken across a line F5-F5 of FIG. 6, for showing a knee protective structure of a second embodiment of the present invention.

As shown in FIG. 5, the left knee protector 120 comprises a knee protective panel assembly 122 and a knee protective pad 123 covering the protective panel assembly 122. The protective panel assembly 122 extends downwardly from the lower end of the instrument panel 114, and is designed to absorb impact energy due to a vehicle collision by undergoing a plastic deformation.

Figure 8:
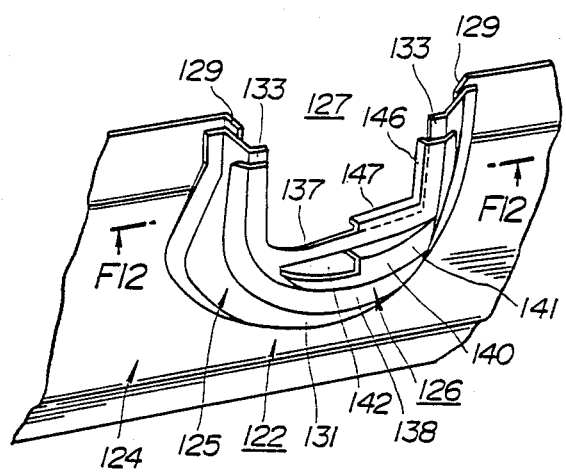
FIG. 8 is a perspective view showing a main portion of the structure of FIG. 5.
Figure 9:
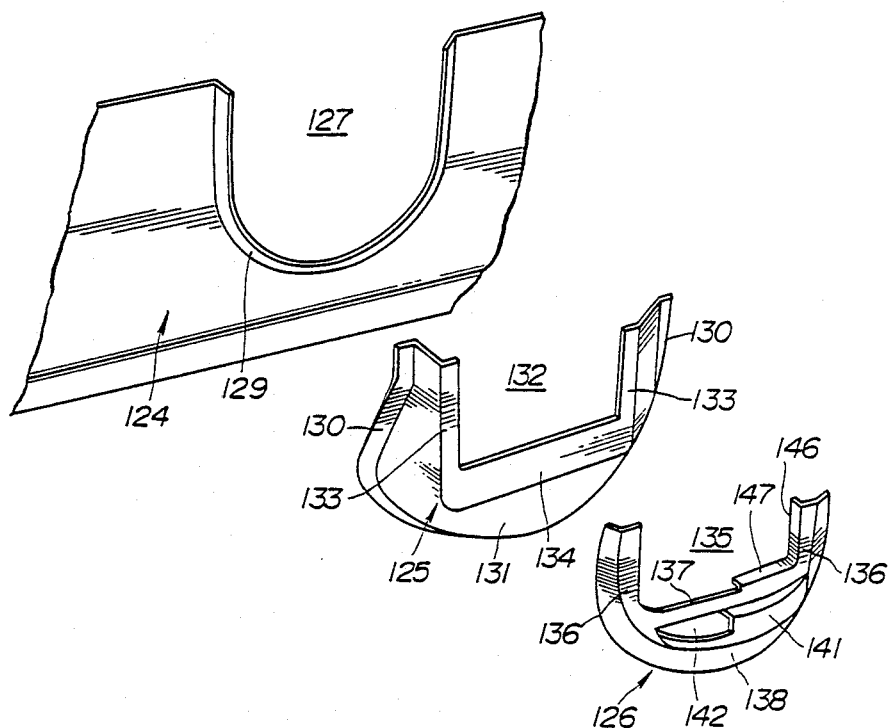
FIG. 9 is an exploded perspective view of the main portion shown in FIG. 8.
Figure 10:
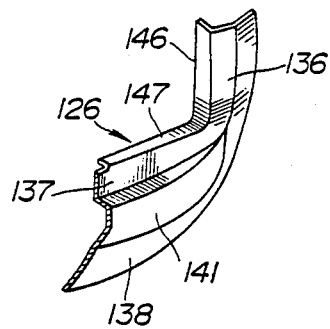
FIG. 10 is an enlarged fragmentary perspective view of a reinforcing member shown in FIG. 9.
Figure 11:
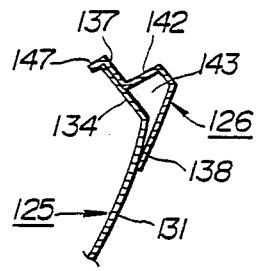
FIG. 11 is a sectional view of an enclosed space formed between the reinforcing member and a bulge member shown in FIG. 9.
Figure 12:
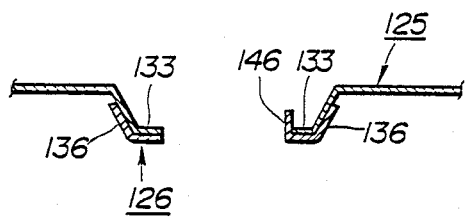
FIG. 12 is a sectional view taken across a line F12-F12 of FIG. 8.

As shown in FIGS. 5, 6 and 8, the knee protective panel assembly 122 comprises a knee protective base panel 124 whose upper end is fixed to the lower end of the instrument panel 114, a bulge neck member 125 of a shaped plate, fixed to the protective panel 124, and a reinforcing member of a shaped plate, fixed to the bulge member 125. The protective base panel 124 is formed with a U-shaped cut 127 for receiving the steering column 118. The protective base panel 124 has an outer surface facing toward the driver's seat, and an inner surface facing toward the front of the vehicle. As shown in FIG. 6, a back channel member 128 extending along the lateral direction of the vehicle is fixed to the inner surface of the protective panel 124 so that there is formed between the back member 128 and the protective panel 124 an enclosed space extending along the lateral direction of the vehicle. At least one vertical back channel member extending from the upper end of the base panel 124 to the lower end is also fixed to the inner surface of the base panel 124 so as to form an enclosed space. The base panel 124 has a flange 129 extending along the U-shaped border of the U-shaped cut 127 from end to end, and projecting rearwardly toward the driver's seat.

The bulge member 125 has a base flange 130 joined to the outer surface of the protective panel 124 around the U-shaped cut 127, a curved side portion 131 projecting from the base flange 130 toward the driver's seat, and a U-shaped brim portion 133 and 134 extending along a U-shaped border of a U-shaped cut 132 of the bulge member 125. The U-shaped brim includes a lateral flange 134 extending along the lateral direction of the vehicle, and left and right vertical side flanges 133 extending upwardly from left and right ends of the lateral flange 134, respectively, so as to form the U-shape. The side portion 131 slopes down from the brim to the base flange 130 like a hillside. Each of the base flange 130, the side portion 131 and the brim of the neck member 125 extends along the flange 129 extends along the u-shaped flange 12 from one end of the flange 129 to the other end, and surrounds the U-shaped cut 132 for receiving the steering column 118 together with the cut 127 of the base panel 124.

The reinforcing member 126 is also U-shaped and formed with a U-shaped cut 135 corresponding to the cut 127 of the base panel 124 and the cut 132 of the bulge member 125. The reinforcing member 126 has a lateral ridge portion 137 joined to the lateral flange 134 of the neck member 125, and left and right side ridge portions 136 joined, respectively, to the left and right side flanges 133 of the neck member 125. The lateral ridge portion 137 extends along the lateral direction of the vehicle. The reinforcing member 126 further has a curved side portion 138 joined to the side portion 131 of the bulge member 125.

The reinforcing member 126 has a crescent-shaped projecting portion 141 which extends along the lateral direction of the vehicle under the U-shaped cut 135, and projecting rearwardly from the lateral ridge portion 137 toward the driver's seat. There is formed, between the crescent-shaped projecting portion 141 of the reinforcing member 126 and the bulge member 125, an enclosed space 143 extending along the lateral direction of the vehicle under the cuts 132 and 135.

The projecting portion 141 of the reinforcing member 126 is formed with an opening 142, as shown in FIGS. 5, 8, 9 and 11. The opening 142 is formed in an outboard half (that is, a left half in this embodiment) of the projecting portion 141. The outboard half of the projecting portion 142 is situated on an outboard side of a vertical plane passing through the axis of the steering column 118, and the inboard half of the projecting portion 142 is situated on an inboard side of the vertical plane. With the opening 142, the projecting portion 141 of the reinforcing member 126 is made less rigid in the outboard half than in the inboard half closer to the longitudinal center line of the vehicle.

In a left oblique collision in which a rearward displacement of the steering column 118 is large but a forward displacement of the leg 102c of the driver is small, the inboard half of the projecting portion 142 having a higher rigidity reliably prevents a forward movement of the right knee notwithstanding a rearward displacement of the steering column 118. In a right oblique collision in which a rearward displacement of the steering column 118 is small, but a forward displacement of the leg 102c is great, the outboard half of the projecting portion 142 having a lower rigidity is plastically deformed by a collision of the knee 102a of the driver, and serves to prevent excessive load from being caused by a collision of the bulge member 125 and the reinforcing member 126 against the steering column 118 and from being applied to the knee 102a. In FIG. 6, a two-dot chain line 144 shows a rearwardly displaced position of the steering column 118, and a two-dot chain line 145 shows a forwardly displaced position of the leg 102.

As shown in FIGS. 8-12, the reinforcing member 126 of this embodiment is further formed with a right flange 146 projecting from an inside edge of the right ridge portion 136 toward the front of the vehicle, and a lateral flange 147 projecting from an inside edge of the right half of the lateral ridge portion 137 toward the front of the vehicle. The right flange 146 extends along the right ridge portion 136, and the lateral flange 147 extends along the lateral direction of the vehicle. The flanges 146 and 147 are formed only in the inboard half of the reinforcing member 126, and further increase the rigidity of the inboard half of the reinforcing member 126. Accordingly, the flanges 146 and 147 serve to prevent a rearward movement of the steering column 118 in cooperation with the projecting portion 141 in a left oblique collision in which a rearward displacement of the steering column 118 is great.

Figure 13:
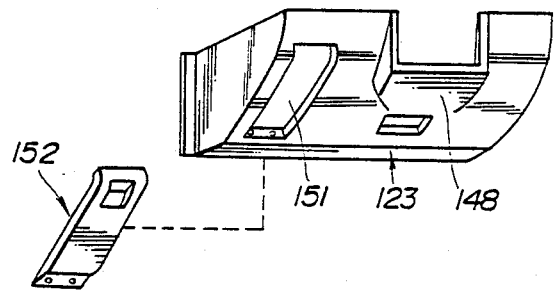
FIG. 13 is a perspective view of a covering pad used in the second embodiment.

The covering pad 123 covers almost the entirety of the outer surface of the knee protective panel assembly 122 facing toward the driver's seat. As shown in FIG. 13, the covering pad 123 has a bulge portion 148 covering the bulge member 125 and the reinforcing member 126. The inner surface of the bulge member 125 facing toward the steering column 118 is covered with an inner portion of the covering pad 123. The inner portion of the covering pad 123 is formed with a projection 149 projecting toward the steering clamp bracket 117. This projection 149 of the pad 123 serves to conceal the inner part of the steering column 118 from sight through the cuts 127, 132 and 135. A reference numeral 150 in FIG. 7 indicates a steering column cover, a numeral 152 in FIGS. 7 and 13 indicates a fuse box lid, and a numeral 151 in FIG. 13 indicates a fuse box.

The vehicle of this example has the steering column on the left side. In the case of a vehicle having a steering column on the right side, the opening 142 is formed in the right half of the projecting portion 141.

Figure 30:
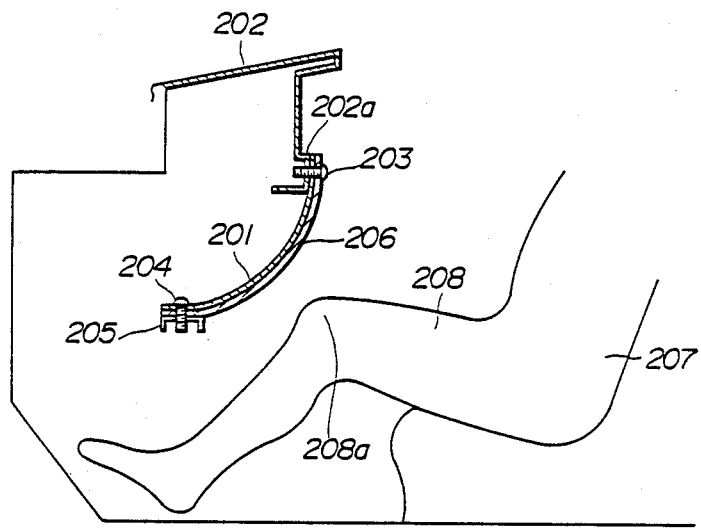
FIGS. 30 and 31 are sectional views showing a conventional structure disclosed in the abovementioned Japanese publication No. 50-2037.
Figure 31:
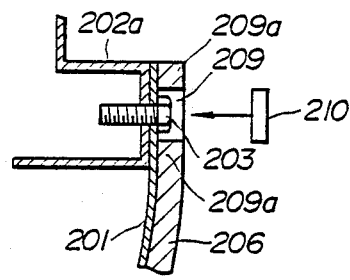

To facilitate understanding of a third embodiment of the present invention, reference is made to the conventional structure shown in FIGS. 30 and 31.

In the structure of FIG. 30, an upper end of a knee protective base panel 201 is fixed with a lower end 202a of an instrument panel 202 by bolts 203. A lower end of the base panel 201 is fixed with a mount member 205 by bolts 204. The base panel 201 is covered with a pad 206. The base panel 201 serves to protect the knees 208a of the legs 208 of a seat occupant 207.

However, this conventional structure is disadvantageous in that the appearance is degraded by the bolts 203 in the conspicuous position. In an example shown in FIG. 31, each bolt 203 is concealed by a mask member 210 fit in a hole 209 of the pad 206. However, the mask members 210 are detrimental to the appearance. Besides, the rigidity of the upper end portion of the knee protective base panel 201 is insufficient.

FIGS. 20–29 show the third embodiment of the present invention. In this embodiment, the present invention is applied to a vehicle having a steering wheel on the left side.

Figure 20:
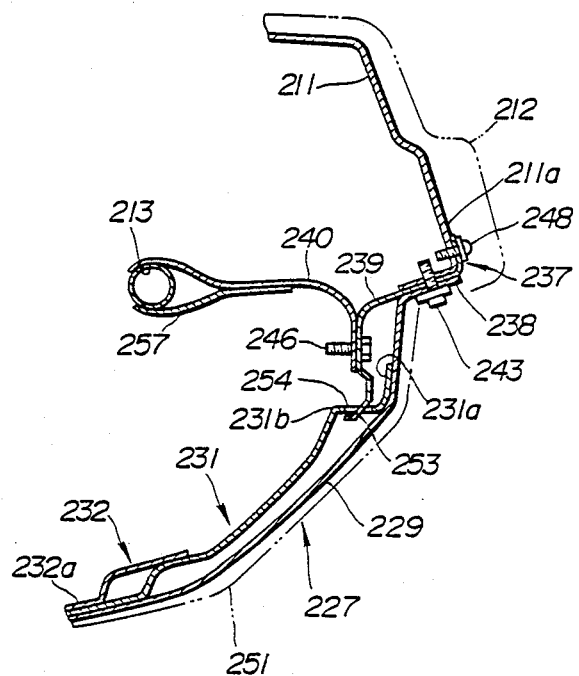
FIG. 20 is a sectional view showing a main portion of a knee protective structure of a third embodiment of the present invention.
Figure 21:
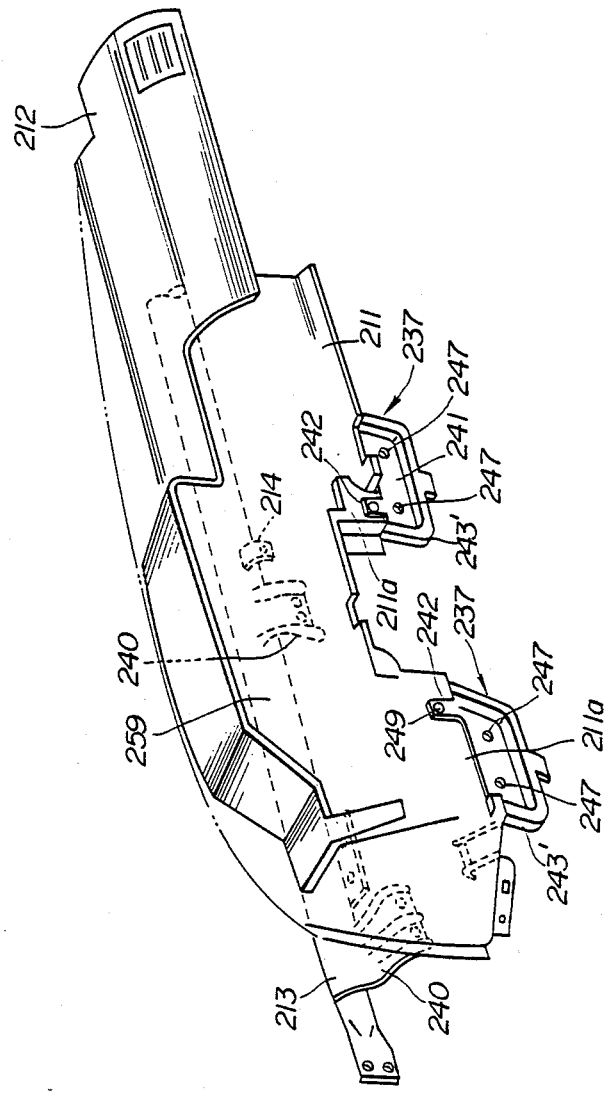
FIG. 21 is a schematic perspective view of a subassembly of an instrument panel and intermediate brackets used in the third embodiment.
Figure 22:
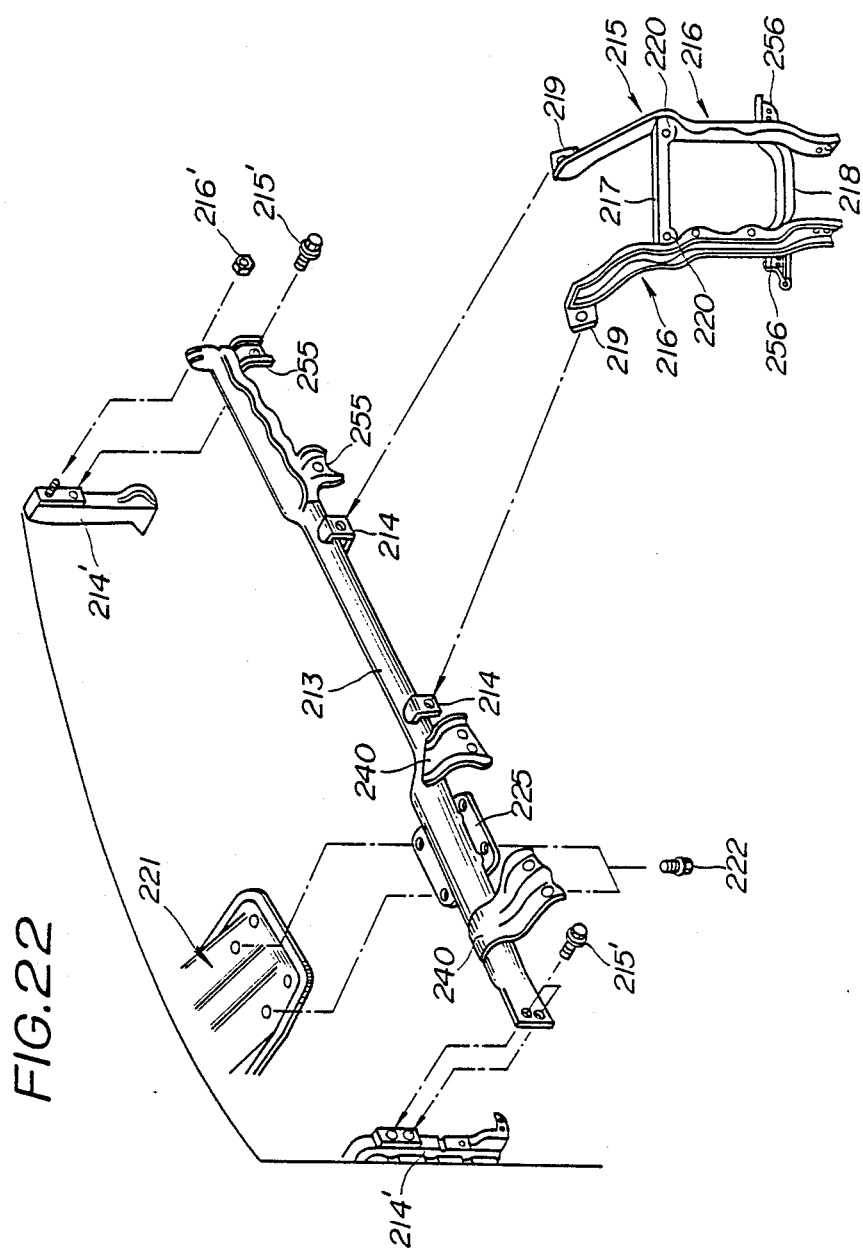
FIG. 22 is an exploded perspective view for showing a steering member shown in FIG. 21.

A structure of a vehicle shown in FIGS. 20 and 21 includes an instrument panel 211, an instrument pad 212 covering the instrument panel 211, and a steering member 213 extending along the lateral direction of the vehicle. As shown in FIG. 22, left and right ends of the steering member 213 are fixed, respectively, to left and right mounting members 214' by bolts 215' and nuts 216'. The left and right mounting members 214 are fixed, respectively, to the left and right sides of the vehicle body. Left and right mounting members 214 are fixed to a central portion of the steering member 213 by welding.

An instrument stay 215 is fixed to the steering member 213 through the mounting members 214. The instrument stay 215 has left and right long vertical members 216, and upper and lower cross members 217 and 218 which are welded between the left and right vertical members 216 so that the instrument stay 215 is shaped like a ladder. Upper ends 219 of the left and right vertical members 21 are fixed, respectively, to the left and right mounting members 214 by bolts. The upper cross member 217 is formed with left and right mounting portions 220. The instrument panel 211 is fixed t the mounting portions 220.

Figure 23:
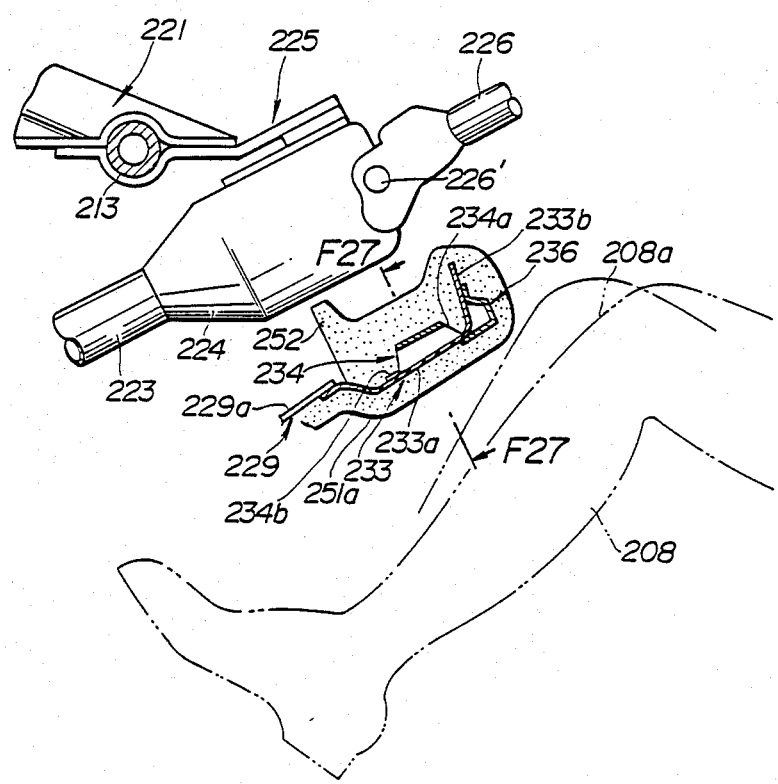
FIG. 23 is a sectional view taken across a line F23-F23 of FIG. 27, for showing a main portion of a knee protective panel of the third embodiment.

A steering mount member 221 is fixed to a left portion of the steering member 213 by bolts 222. The steering column of this example is a tiltable type, and has lower and upper steering columns 223 and 226, as shown in FIG. 23. The upper steering column 226 is swingable on a pivot pin 226'. As shown in FIG. 23, a steering clamp bracket 224 clamping the lower steering column 223 is fixed to the steering mount member 221 through a bracket 225.

Figure 24:
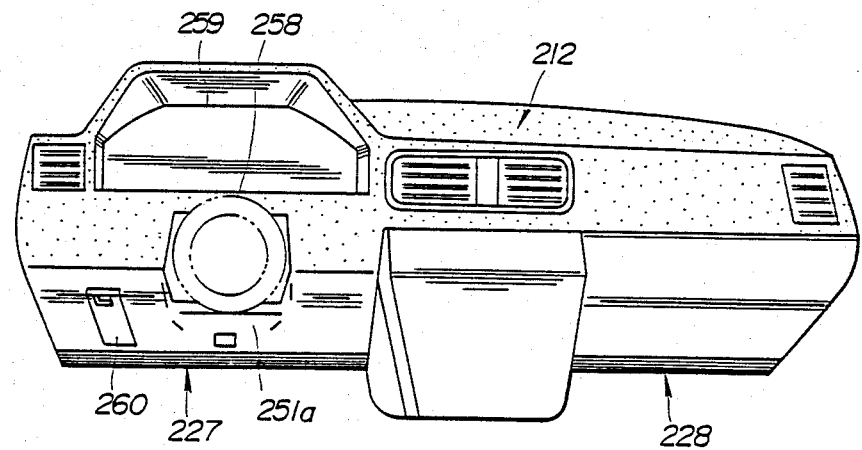
FIG. 24 is a view of the assembly of the knee protective panel of the third embodiment and the instrument panel.
Figure 25:
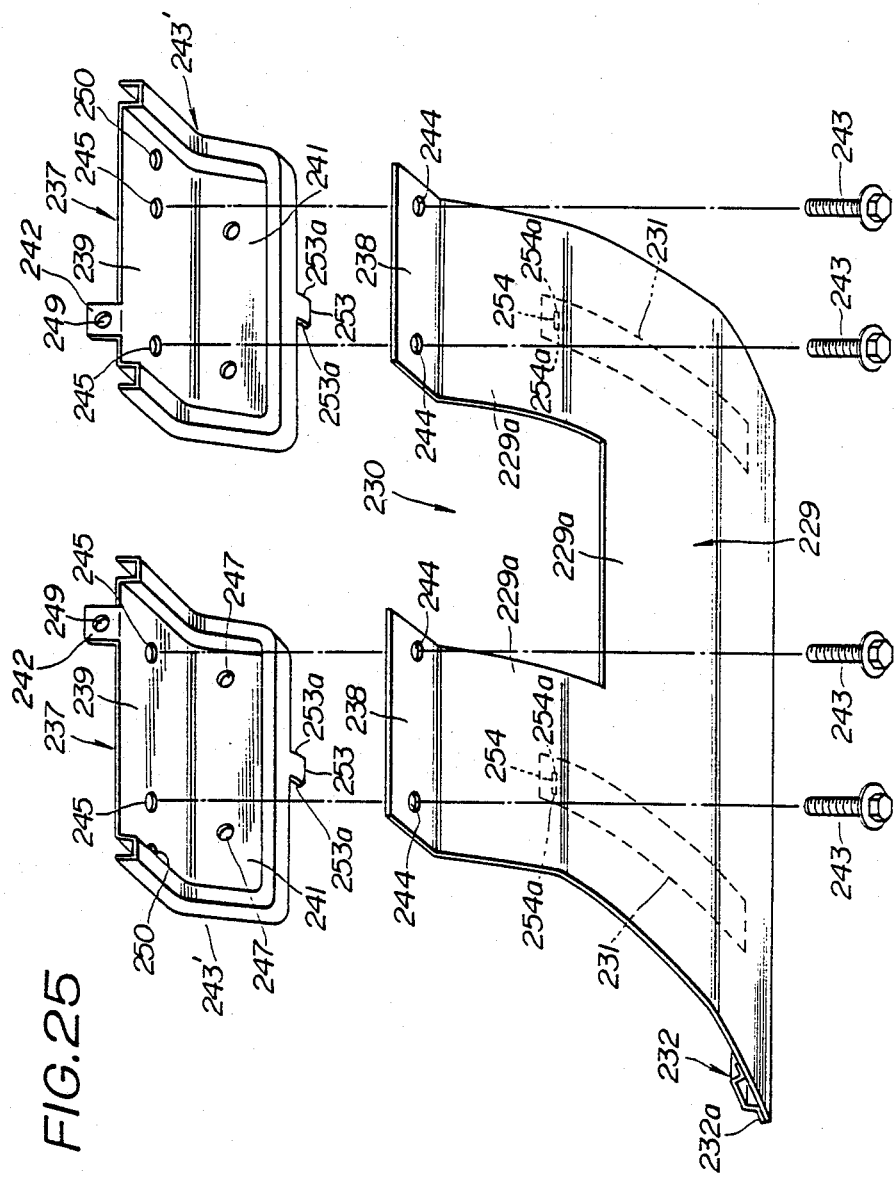
FIG. 25 is a perspective view showing the intermediate brackets shown in FIGS. 20 and 21 and the knee protective base panel.
Figure 26:
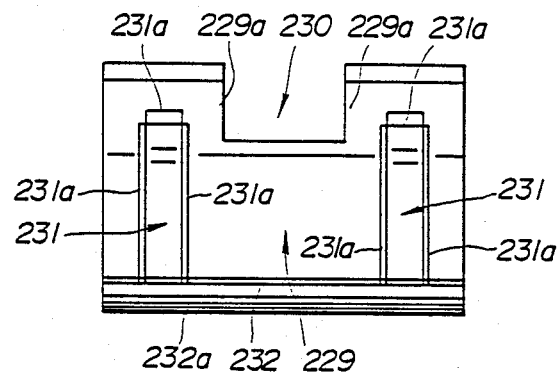
FIG. 26 is a view showing an inner surface of the base panel shown in FIG. 25.

There are further provided left and right knee protectors 227 and 228 under the instrument panel 211, as shown in FIG. 24. The left knee protector 227 confront a left front seat which is a driver's seat in this example, and the right knee protector 228 confronts a right front seat. The left knee protector 227 includes a knee protective base panel 229 which is approximately in the shape of a rectangle having a rectangular cut 230 in an upper edge, as shown in FIG. 25. The base panel 229 extends from a left side to a right side along the lateral direction of the vehicle, and extends downwardly from the lower end of the instrument panel 211 toward the floor of the passenger compartment. The base panel 229 is designed to be plastically deformed by impact force in collisions. The cut 230 is formed in the middle of the upper side of the base panel 229 to receive the upper steering column 226. The base plate 229 has left and right upper mounting flanges 238 which are separated by the cut 230. The base panel 229 has an outer surface facing toward the driver's seat, and an inner surface facing toward the lower steering column 223. As shown in FIG. 26, left and right vertical back channel member 231 and a lateral back channel member 232 are welded to the inner surface of the base panel 229 so that there is formed between each back member and the base panel 229 an enclosed space extending from one end of the back member to the other end. The left and right vertical back members 231 extend substantially vertically under the left and right flanges 238, respectively. The lateral back member 232 extends along the lower end of the base panel 229 from the left side of the panel 229 to the right side. The base panel 229 is endowed with an appropriate rigidity by the back members 231 and 232. As shown in FIG. 26, each of the back members 231 and 232 is formed with flanges 231a or 232a joined to the base panel 229.

Figure 27:
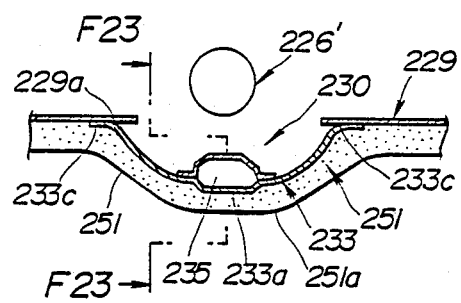
FIG. 27 is a sectional view taken across a line F27 and F27 of FIG. 23.
Figure 28:
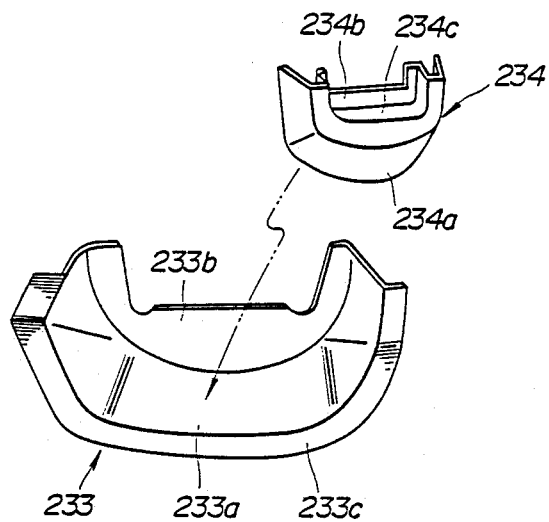
FIG. 28 is an exploded perspective view showing a bulge member and an inside reinforcing member used in the third embodiment.

A bulge member 233 is welded to the outer surface of the base panel 229, as shown in FIGS. 23 and 27. As shown in FIG. 28, the bulge member 233 is a shaped plate, and has a curved side portion 233a, a top inward flange 233b and a base outward flange 233c. The base flange 233c of the bulge member 233 is welded to a fringe portion 229a of the base panel 229 surrounding the cut 230. The base flange 233c extends along a laterally extending bottom border and vertically extending left and right side borders of the rectangular cut 230. The curved side portion 233a projects from the base flange 233c to the top flange 233b in the rearward direction toward the driver's seat. The curved portion 233a is smoothly curved like a conical surface so as not to hinder movements of the driver's legs, and extends under the steering column so as to describe an arc of a circle around the steering column. The bulge member 233 thus bulges toward the driver's seat. Therefore, the space between the bulge member 233 and the steering column is increased, so that the bulge member 233 can be deformed largely without bumping against the steering column.

An inside reinforcing member 234 shown in FIG. 28 is welded to an inner surface of the bulge member 233 in such a manner that there is formed, between the inside reinforcing member 234 and the bulge member 233, an enclosed space 235 extending under and along the steering column, as shown in FIG. 27. The bulge member 233 and the inside reinforcing member 234 serve to absorb impact energy of the rearwardly thrusting steering column in a vehicle collision. An outside reinforcing member 236 is welded to an outer surface of the top flange 233b of the bulge member 233, as shown in FIG. 23. The outside reinforcing member 236 extends along the lateral direction under the steering column. Between the outside reinforcing member 236 and the top flange 233b of the bulge member 233, there is formed an enclosed space extending along the lateral direction of the vehicle under the steering column. The outside reinforcing member 236 cooperates with the bulge member 233 and the base panel 229 in absorbing impact energy applied to the knee 208a of the driver in a collision. The inside reinforcing member 234 has a curved upper portion 234a, a flange 234b joined to the portion 233a of the bulge member 233, and a lower portion 234c.

As shown in FIGS. 20 and 21, the base panel 229 is fixed to the lower end 211a of the instrument panel 211 through left and right intermediate brackets 237. Each of the brackets 237 has an approximately vertical lower flat portion 241 and an approximately horizontal upper flat portion 239 projecting from an upper end of the lower portion 241 toward the rear of the vehicle. Each bracket 237 further has a projecting portion 242 projecting upwardly from the rear edge of the upper portion 239, and a reinforcing fringe portion 243' having a channel section and extending along the left and right side borders of the upper and lower portions 239 and 241 and the bottom border of the lower portion 241. The upper portion 239 of each bracket 237 is formed with holes 245 for receiving bolts 243 and another bolt hole 250, and the lower portion 241 of each bracket 237 is formed with holes 247 for receiving bolts 246 shown in FIG. 20. The projecting portion 242 of each bracket 237 is formed with a hole 249 for receiving a bolt 248 shown in FIG. 20. Each of the left and right upper mounting flanges 238 of the base panel 229 is formed with holes 244 for receiving the bolts 243.

Each intermediate bracket 237 is fastened to the lower end 211a of the instrument panel 211 by the bolt 248 inserted into the hole 249 and another bolt (not shown) inserted into the hole 250 of the upper portion 239. The bolts 248 are covered with the instrument pad 212. The upper portions 239 of the left and right intermediate brackets 237 are fastened, respectively, with the left and right upper flanges 238 of the base panel 229 by the bolts 243. (In FIG. 25 nuts for the bolts 243 are omitted.) In this way, the base panel 229 is fixed with the lower end 211a of the instrument panel 211 through the intermediate brackets 237. In this assembled structure, the upper portions 239 of the brackets 237 and the upper flanges 238 of the base panel 229 are substantially horizontal, and accordingly the bolts 243 extends substantially vertically.

Figure 29:
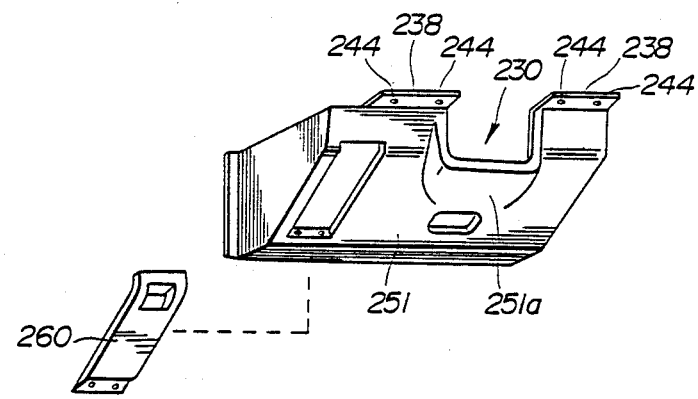
FIG. 29 is a perspective view of a covering pad of the third embodiment.

As shown in FIG. 29, the entire outer surface of the base panel 229 is covered with a pad 251 except the upper flanges 238. The pad 251 has a bulge portion 251a which covers the outer surfaces of the bulge member 233 and the outside reinforcing member 236. As shown in FIG. 23, the pad 251 covers the edge of the bulge member 233, and has an inner portion extending from the edge of the bulge member 233 along the inner surface of the bulge member 233 to cover the inner surface of the bulge member 233 and the inside reinforcing member 234. The inner portion of the pad 251 is formed with an upward projection 252 projecting toward the steering clamp bracket 224 to conceal the lower part of the steering column.

There are further provided left and right support brackets 240 supporting the left knee protector 227. A front end of each bracket 240 is welded to the steering member 213. Each bracket 240 extends rearwardly from the steering member 213 to a rear end. The rear ends of the left and right brackets 240 are fastened, respectively, with the left and right intermediate brackets 237 by the bolts 246 inserted into the holes 247. Each bracket 240 is reinforced by a member 257 shown in FIG. 20. As shown in FIG. 25, each intermediate bracket 237 has a downward projection 253 projecting from the bottom edge of the bracket 237. The downward projections 253 are inserted, respectively, in holes 254 formed in upper end walls 231b of the vertical left and right back channel members 231, as shown in FIGS. 20 and 25. When an impact of the knee against the base panel 229 causes a force plastically deforming the base panel 229 in the lateral direction of the vehicle, one side 253a of the downward projection 253 of at least one bracket 237 abuts against one side wall 254a of the hole 254. In this way, a load applied on the base panel 229 is transmitted to the steering member 213 through the intermediate brackets 237 and the support brackets 240. The brackets 240 serve as an impact transmitting member for transmitting a load applied by the knee on the base panel 229, to the steering member 213.

In the same manner as the left knee protector 227, the right knee protector 228 is fixed to the lower end of the instrument panel 211 through left and right intermediate brackets (not shown), which are fixed, respectively, with left and right supporting brackets 255 fixed to a right portion of the steering member 213. Lower ends of the inboard sides of the left and right knee protectors 227 and 228 are fixed, respectively, to left and right ends 256 of the cross member 218 of the instrument stay 215. Thus, the left and right knee protectors 227 and 228 are united so that a load applied on each protector by a collision can be dispersed.

In FIG. 24, a reference numeral 258 denotes a steering column cover, 259 a portion for mounting indicating meters, and 260 a fuse box lid.

In the structure of the third embodiment, the fasteners 243 for fastening the upper end of the knee protectors can be placed at secluded positions under the instrument panel, so that the appearance can be improved. Furthermore, the rigidity of the upper portion of the base panel of each protector is improved with the supporting brackets 240.

What is claimed is:

1. A knee protective structure of a vehicle, comprising;
    a protective panel extending along a lateral direction of the vehicle under an instrument panel in front of a driver's seat, and having a hollow portion for receiving a steering column of the vehicle, said protective panel having an upper border which extends along the lateral direction of the vehicle and is fixed to a lower border of said instrument panel, and said hollow portion being a U-shaped cut formed in said upper border, said protective panel having an outer surface facing toward the driver's seat, and an inner surface facing toward a front of the vehicle, said protective panel further having a bulge portion projecting toward the driver's seat and having a projecting end portion in which said U-shaped cut is formed; and
    a reinforcing member fixed to said protective panel so that there is formed between said protective panel and said reinforcing member and enclosed space extending along the lateral direction of the vehicle under said hollow portion, said reinforcing member being fixed to said outer surface of said protective panel and to said bulge portion so that said enclosed space is formed on said projecting end portion under said U-shaped cut.

2. A structure according to claim 1 wherein said bulge portion has a brim which is formed in said projecting end portion and extends along a boundary of said U-shaped cut from one end to the other, and said reinforcing member extends along the boundary o said U-shaped cut, and covers said brim.

3. A structure according to claim 2 wherein said outer surface of said protective panel, and said reinforcing member are covered with a protective pad.

4. A structure according to claim 1 further comprising a steering member which extends along the lateral direction of the vehicle, and supports the steering column, and left and right support brackets fixedly mounted on said steering member on left and right sides of the steering column, respectively, each of said support brackets extending to said protective panel and being fixed to said protective panel.

5. A knee protective structure of a vehicle, comprising;
    a protective panel extending along a lateral direction of the vehicle under an instrument panel in front of a dirver's seat, and having a hollow portion for receiving a steering column of the vehicle; and
    a reinforcing member fixed to said protective panel so that there if formed between said protective panel and said reinforcing member an enclosed space extending along the lateral direction of the vehicle under said hollow portion;
    said protective panel has an upper border which extends along the lateral direction of the vehicle and is fixed to a lower border of said instrument panel, and said hollow portion is a U-shaped cut formed in said upper border;
    said protective panel has an outer surface facing toward the driver's seat, and an inner surface facing toward a front of the vehicle, and said reinforcing member is fixed to said outer surface of said protective panel;
    said protective panel has a bulge portion projecting toward the driver's seat and a projecting end portion in which said U-shaped cut is formed so that said enclosed space is formed on said projecting end portion under said U-shaped cut;
    said bulge portion has a brim which is formed in said projecting end portion and extends along a boundary of said U-shaped cut from one end to the other, and said reinforcing member extends along the boundary of said U-shaped cut and covers said brim;
    said outer surface of said protective panel, and said reinforcing member are covered with a protective pad; and
    said reinforcing member has an inboard half lying on an inboard side of the steering column and an outboard half lying on an outboard side of the steering column and having a rigidity lower than a rigidity of said inboard portion of said reinforcing member.

6. A structure according to claim 5 wherein said reinforcing member has an opening formed in said outboard half to reduce the rigidity.

7. A structure according to claim 6 wherein said reinforcing member has an projecting portion which extends along the lateral direction of the vehicle and forms said enclosed space, and said opening is formed in said projecting portion.

8. A structure according to claim 7 wherein said reinforcing member has an inward flange which is formed in said inboard half and project from an edge of said brim of said bulge portion toward the front of the vehicle.

9. A structure according to claim 8 wherein said protective panel comprises a base panel, and a bulge member of a shaped plate fixed to said base panel to form said bulge portion.

10. A knee protective structure of a vehicle, comprising;
    a protective panel extending along a lateral direction of the vehicle under an instrument panel in front of a driver's seat, and having a hollow portion for receiving a steering column of the vehicle;
    a reinforcing member fixed to said protective panel so that there is formed between said protective panel and said reinforcing member an enclosed space extending along the lateral direction of the vehicle under said hollow portion;
    said protective panel has an upper border which extends along the lateral direction of the vehicle and is fixed to a lower border of said instrument panel, and said hollow portion is a U-shaped cut formed in said upper border;
    said protective panel has an outer surface facing toward the driver's seat, and an inner surface facing toward a front of the vehicle, and said reinforcing member is fixed to said outer surface of said protective panel;
    said protective panel has a bulge portion projecting toward the driver's seat and a projecting end portion in which said U-shaped cut is formed, and said reinforcing member is fixed to said bulge portion so that said enclosed space is formed on said protecting end portion under said U-shaped cut;
    a steering member which extends along the lateral direction of the vehicle, and supports the steering column, and left and right support brackets fixedly mounted on said steering member on left and right sides of the steering column, respectively, each of said support brackets extending to said protective panel and being fixed to said protective panel; and
    left and right intermediate brackets which are fixed to a lower border of said instrument panel and said upper border of said protective panel to join said instrument panel and said protective panel, and placed on the left and right sides of the steering column, respectively, each of said intermediate brackets has a first portion to which said upper border of said protective panel is fixed, and which is substantially flat and horizontal.

11. A structure according to claim 10 wherein said left and right support brackets are fixed to said protective panel through said left and right intermediate brackets, respectively.

12. A structure according to claim 11 wherein each of said intermediate brackets has a substantially flat second portion which projects downwardly from a front end of said first portion, and to which one of said support brackets is fixed.

13. A structure according to claim 12 wherein said protective panel has left and right upper rearward flanges which are formed in said upper border on both sides of said U-shaped cut so as to project toward the driver's seat, and fixed, respectively, to downwardly facing surfaces of said first portions of said left and right intermediate bracket by at least one bolt extending substantially vertically, said second portion of each of said intermediate bracket being spaced from said protective panel.

14. A structure according to claim 13 wherein each said intermediate brackets has a downward projection projecting downwardly from a bottom of said second portion, and said protective panel comprises a base panel having said inner and outer surfaces of said protective panel, and left and right back channel members which are fixed to said inner surface of said base panel so that there is formed between said base panel and each of said back channel members a vertically extending enclosed space, each of said back channel members having an upper end wall formed with a hole in which said downward projection of one of said intermediate brackets is inserted.

15. A structure according to claim 14 wherein said protective panel comprises an inside member fixed to an inner surface of said bulge portion so as to form an enclosed space extending along the steering column.

16. A knee protective structure of a vehicle, comprising;
    an instrument panel, a steering member extending along a lateral direction of the vehicle at a position forward of said instrument panel,
    a knee protective panel extending in the lateral direction under said instrument panel, and being covered with a pad,
    an intermediate bracket to which a lower end of said instrument panel is fixed, said intermediate bracket having a first portion which is substantially flat and horizontal and to which an upper end of said protective panel is fixed by fastening means extending substantially vertically, and
    a support bracket extending along a longitudinal direction of the vehicle and having a front end fixed to said steering member and a rear end fixed to said intermediate bracket.

* * * * *